(12) United States Patent
Caulfield et al.

(10) Patent No.: US 11,392,383 B2
(45) Date of Patent: Jul. 19, 2022

(54) APPARATUS AND METHOD FOR PREFETCHING DATA ITEMS

(71) Applicant: Arm Limited, Cambridge (GB)

(72) Inventors: Ian Michael Caulfield, Cambridge (GB); Peter Richard Greenhalgh, Cambridge (GB); Frederic Claude Marie Piry, Cagnes sur Mer (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/041,312

(22) PCT Filed: Mar. 14, 2019

(86) PCT No.: PCT/GB2019/050724
§ 371 (c)(1),
(2) Date: Sep. 24, 2020

(87) PCT Pub. No.: WO2019/202287
PCT Pub. Date: Oct. 24, 2019

(65) Prior Publication Data
US 2021/0019148 A1    Jan. 21, 2021

(30) Foreign Application Priority Data

Apr. 16, 2018    (GB) ..................... 1806170

(51) Int. Cl.
*G06F 9/38*    (2018.01)
*G06F 12/0875*    (2016.01)
*G06F 9/345*    (2018.01)

(52) U.S. Cl.
CPC .......... *G06F 9/3802* (2013.01); *G06F 9/3455* (2013.01); *G06F 9/382* (2013.01);
(Continued)

(58) Field of Classification Search
None
See application file for complete search history.

(56) References Cited

U.S. PATENT DOCUMENTS 4,714,994 A * 12/1987 Oklobdzija ........... G06F 9/3802
712/E9.058
5,727,194 A * 3/1998 Shridhar ................. G06F 8/447
712/241

(Continued)

FOREIGN PATENT DOCUMENTS

EP    0855644 A2 *  7/1998 ........... G06F 9/3806
EP    3550437 B1 * 10/2021 .......... G06F 12/0811
JP    H04-344935    12/1992

OTHER PUBLICATIONS

'The Performance of Runtime Data Cache Prefetching in a Dynamic Optimization System' by Jiwei Lu et al, Proceedings of the 36th International Symposium on Microarchitecture, 2003. (Year: 2003).*

(Continued)

*Primary Examiner* — Steven G Snyder
(74) *Attorney, Agent, or Firm* — Nixon & Vanderhye P.C.

(57) ABSTRACT

Examples of the present disclosure relate to an apparatus comprising execution circuitry to execute instructions defining data processing operations on data items. The apparatus comprises cache storage to store temporary copies of the data items. The apparatus comprises prefetching circuitry to a) predict that a data item will be subject to the data processing operations by the execution circuitry by determining that the data item is consistent with an extrapolation of previous data item retrieval by the execution circuitry, and identifying that at least one control flow element of the instructions indicates that the data item will be subject to the data processing operations by the execution circuitry; and b) prefetch the data item into the cache storage.

13 Claims, 8 Drawing Sheets

Figure 1A:
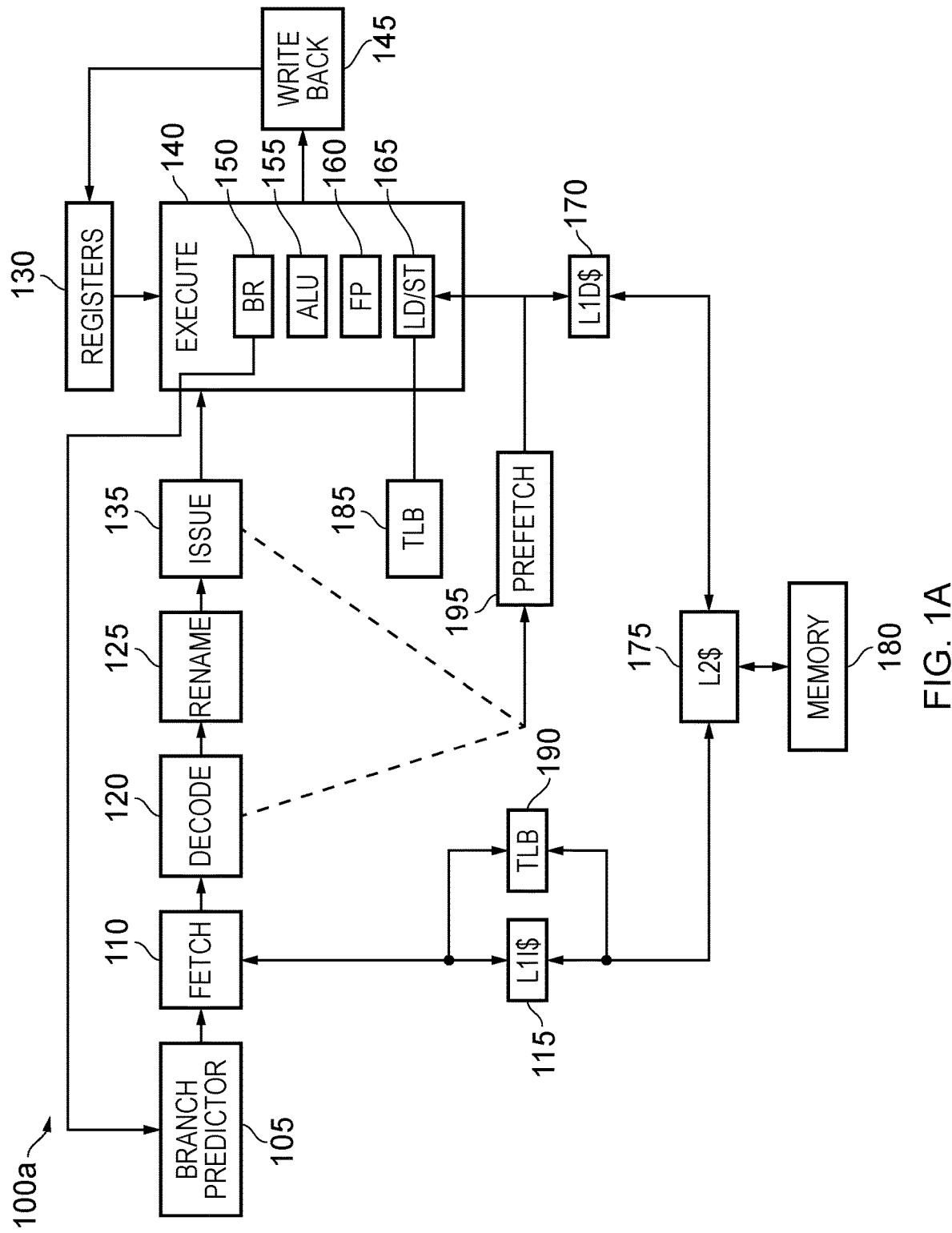

(52) U.S. Cl.
CPC .......... *G06F 9/383* (2013.01); *G06F 12/0875* (2013.01); *G06F 2212/1021* (2013.01); *G06F 2212/452* (2013.01)

(56) References Cited

U.S. PATENT DOCUMENTS

| | | | | |
|---|---|---|---|---|
| 5,829,028 | A * | 10/1998 | Lynch | G06F 12/0862 711/120 |
| 5,838,940 | A * | 11/1998 | Savkar | G06F 9/3855 712/216 |
| 5,953,512 | A * | 9/1999 | Cai | G06F 9/383 712/205 |
| 6,112,729 | A * | 9/2000 | Barnes | F02D 41/0052 123/568.21 |
| 6,687,813 | B1 * | 2/2004 | Norman | G06F 9/30058 712/233 |
| 6,918,010 | B1 | 7/2005 | Yeager | |
| 9,519,586 | B2 | 12/2016 | Gilbert | |
| 9,971,694 | B1 * | 5/2018 | Meier | G06F 9/30047 |
| 10,572,259 | B2 * | 2/2020 | Beu | G06F 9/30036 |
| 2008/0229070 | A1 | 9/2008 | Charra et al. | |
| 2011/0238920 | A1 * | 9/2011 | Hooker | G06F 12/0862 711/E12.071 |
| 2012/0072702 | A1 | 3/2012 | Pierson et al. | |
| 2012/0166511 | A1 * | 6/2012 | Hiremath | G06F 9/3802 708/622 |
| 2013/0185516 | A1 | 7/2013 | Sassone et al. | |
| 2014/0122846 | A1 | 5/2014 | Vasekin et al. | |
| 2014/0143522 | A1 | 5/2014 | Saidi et al. | |
| 2014/0208039 | A1 * | 7/2014 | Gilbert | G06F 9/3832 711/137 |
| 2015/0121014 | A1 | 4/2015 | Dasika et al. | |
| 2015/0121038 | A1 | 4/2015 | Dasika et al. | |
| 2016/0019065 | A1 | 1/2016 | Hayenga et al. | |
| 2016/0328172 | A1 * | 11/2016 | Rappoport | G06F 9/3834 |
| 2019/0227796 | A1 * | 7/2019 | Beu | G06F 12/0875 |

OTHER PUBLICATIONS

International Search Report for PCT/GB2019/050724 dated May 27, 2019, 3 pages.
Written Opinion of the ISA for PCT/GB2019/050724 dated May 27, 2019, 9 pages.
Combined Search and Examination Report for GB Application No. 1806170.5 dated Oct. 22, 2018, 8 pages.
Mutlu, "15-740/18-740 Computer Architecture Lecture 24: Prefetching", Carnegie Mellon University, Nov. 11, 2011, 74 pages.
Arm Limited, "Whitepaper—Cache Speculation Side-channels", Feb. 2018, Version 1.2, 13 pages.

* cited by examiner

APPARATUS AND METHOD FOR PREFETCHING DATA ITEMS

CROSS-REFERENCE TO RELATED APPLICATIONS

This application is the U.S. national phase of International Application No. PCT/GB2019/050724 filed Mar. 14, 2019 which designated the U.S. and claims priority to GB Application No. 1806170.5 filed Apr. 16, 2018, the entire contents of each of which are hereby incorporated by reference.

The presented technique relates to the field of data processing. More particularly, it relates to prefetching of data items.

Some data processing apparatuses, such as central processing units, execute instructions defining data processing operations. The data processing operations are performed on data items. In some such apparatuses, the data items are stored in a storage, for example a memory such as a dynamic random access memory (DRAM), and temporary copies of the data items are stored in a cache for faster access during the data processing operations. The process of fetching data items from the storage to the cache can be slow relative to the time to perform a typical data processing operation, and so the fetching can represent a bottleneck in processing performance.

In some systems, prefetching of data items is performed in order to reduce the effects of the aforementioned bottleneck, by fetching data items to the cache in advance of their being subject to data processing operations. It would be desirable to improve the prefetching process in order to improve overall processing performance.

In one example configuration, there is provided an apparatus comprising:
execution circuitry to execute instructions defining data processing operations on data items;
cache storage to store temporary copies of the data items; and
prefetching circuitry to:
a) predict that a data item will be subject to the data processing operations by the execution circuitry by:
determining that the data item is consistent with an extrapolation of previous data item retrieval by the execution circuitry; and
identifying that at least one control flow element of the instructions indicates that the data item will be subject to the data processing operations by the execution circuitry, and
b) prefetch the data item into the cache storage.

In another example configuration, there is provided a method comprising:
predicting that a data item will be subject to a data processing operation by:
determining that the data item is consistent with an extrapolation of previous data item retrieval; and
identifying that at least one control flow element of the instructions indicates that the data item will be subject to the data processing,
prefetching the data item into cache storage; and
executing the data processing operation on the data item.

Figure 1B:
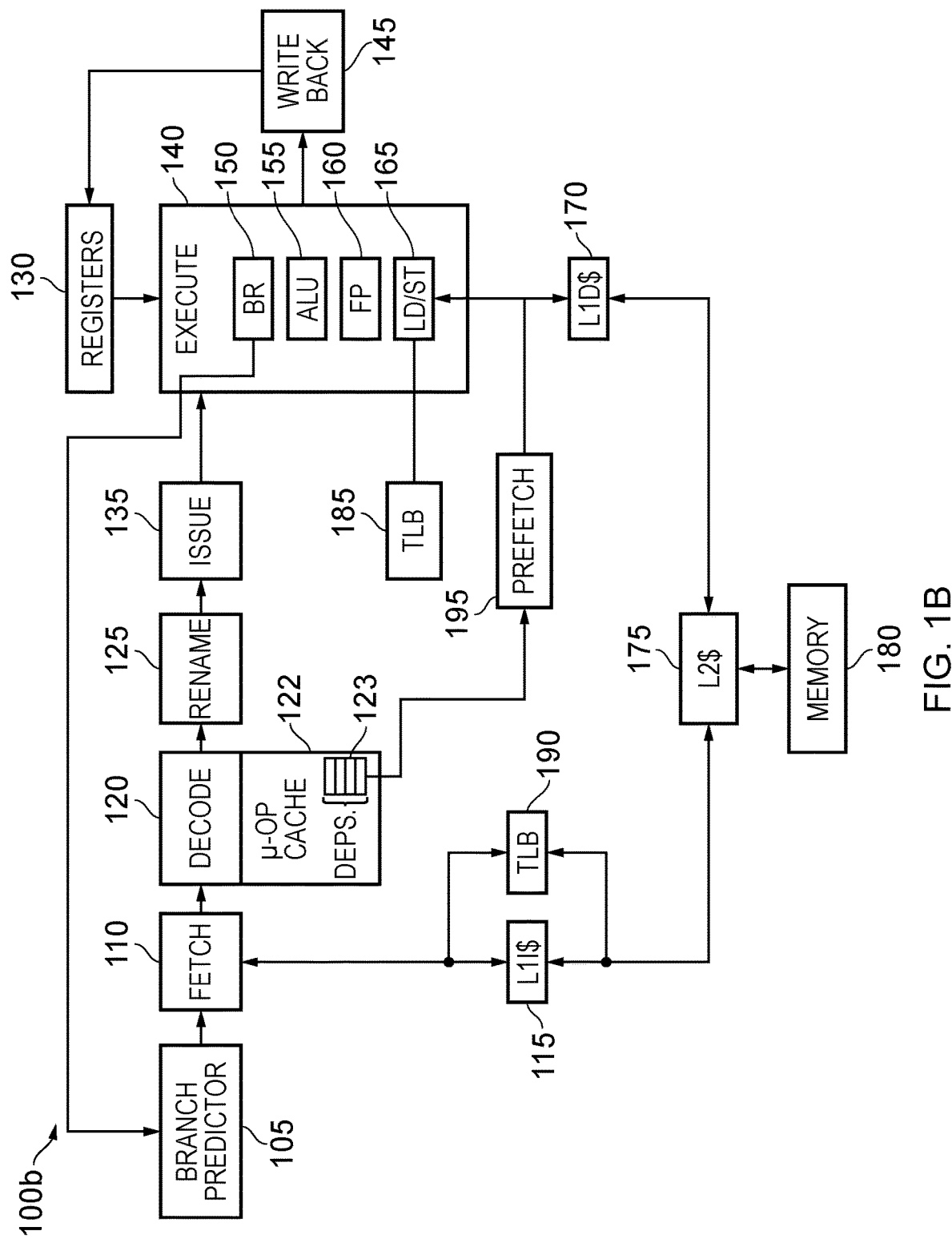
Figure 1C:
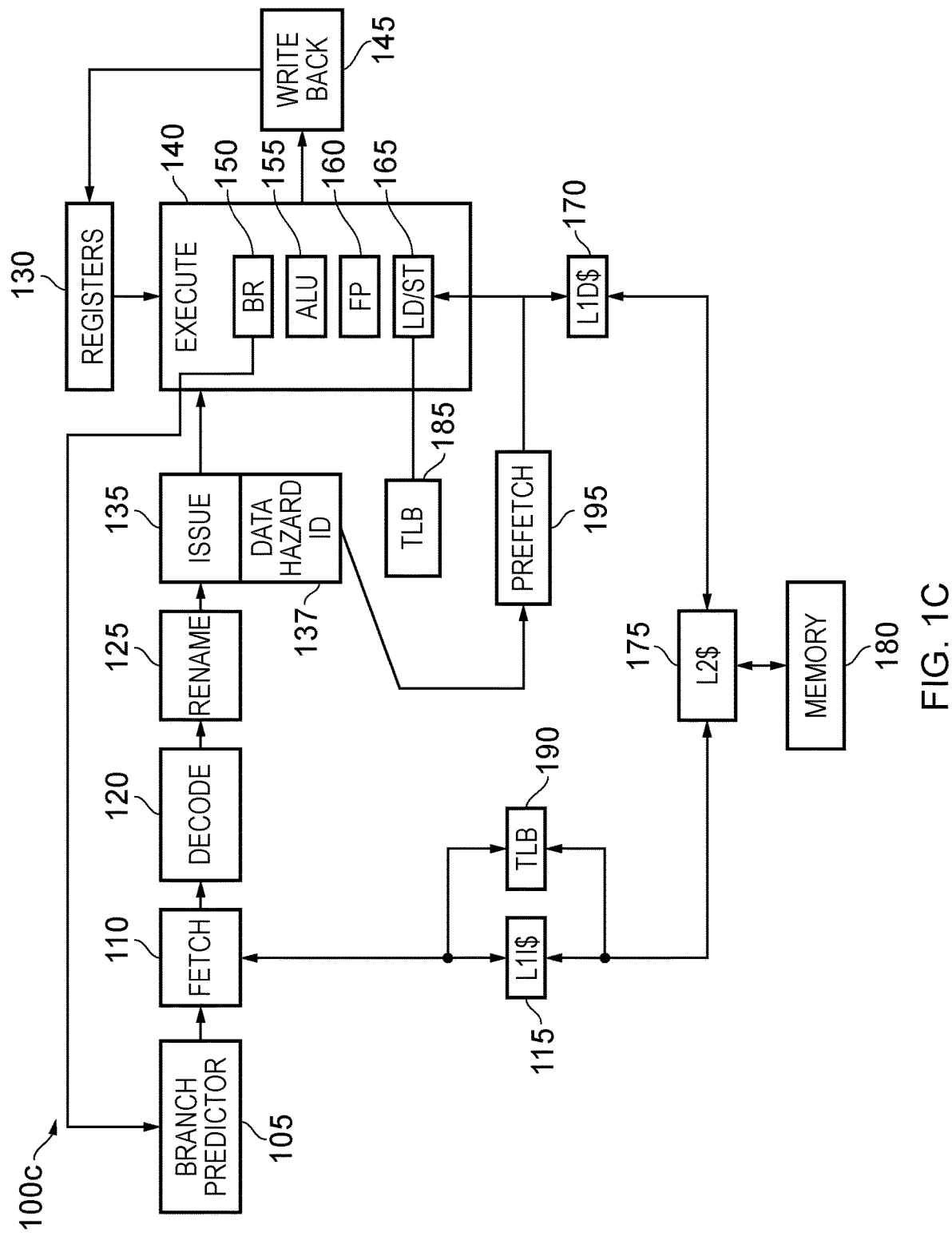
Figure 2A:
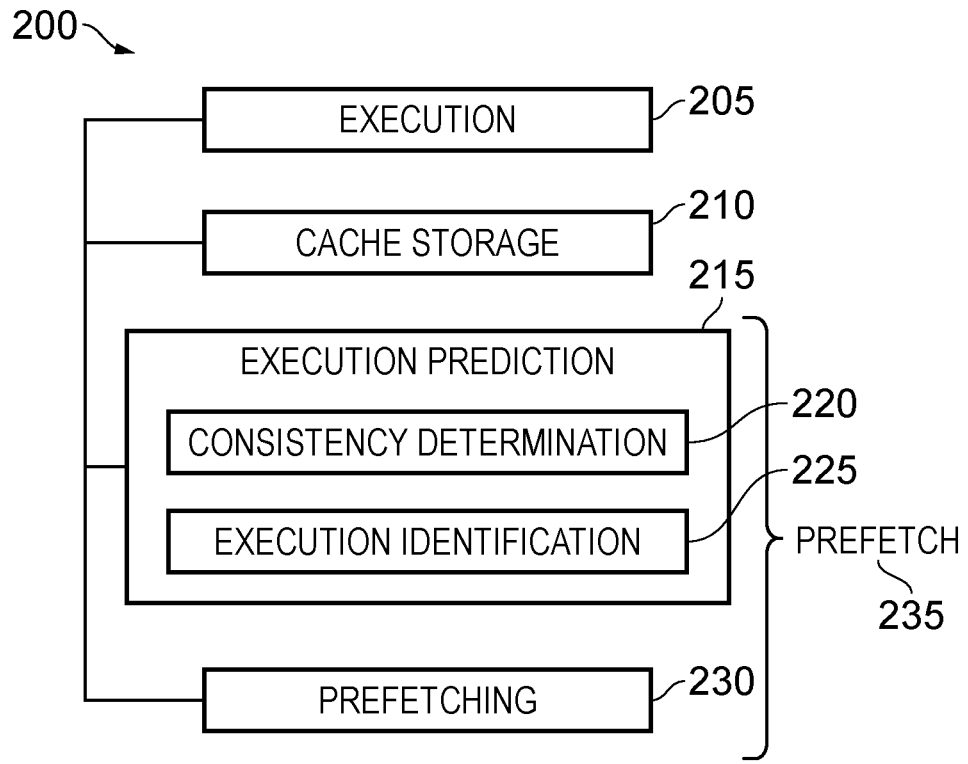
Figure 2B:
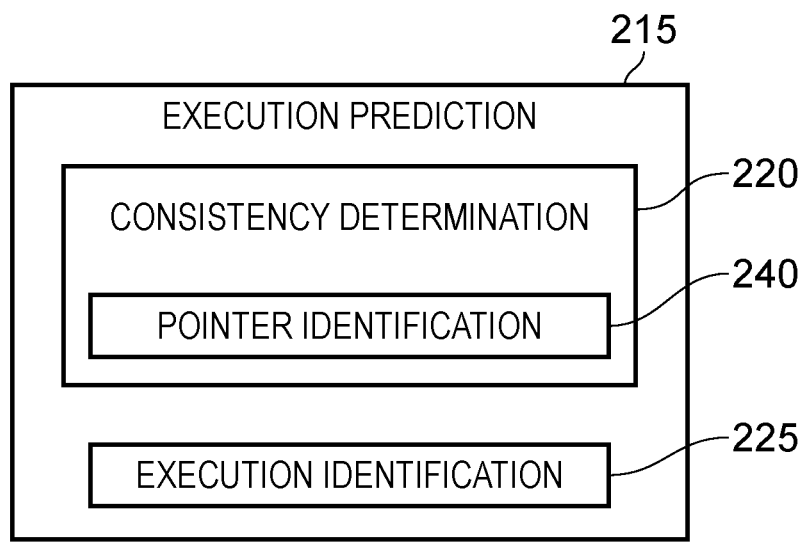
Figure 3:
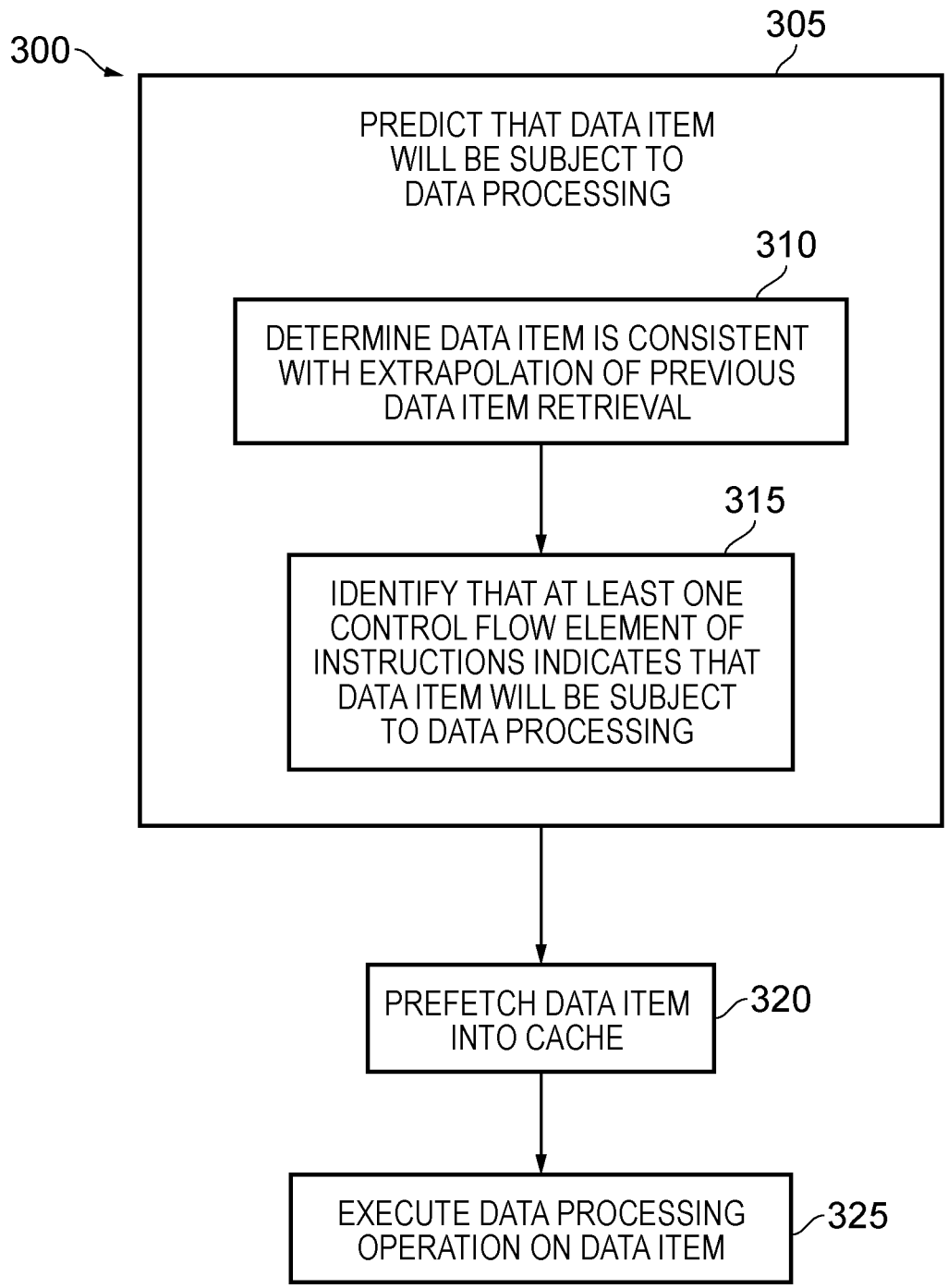
Figure 4A:
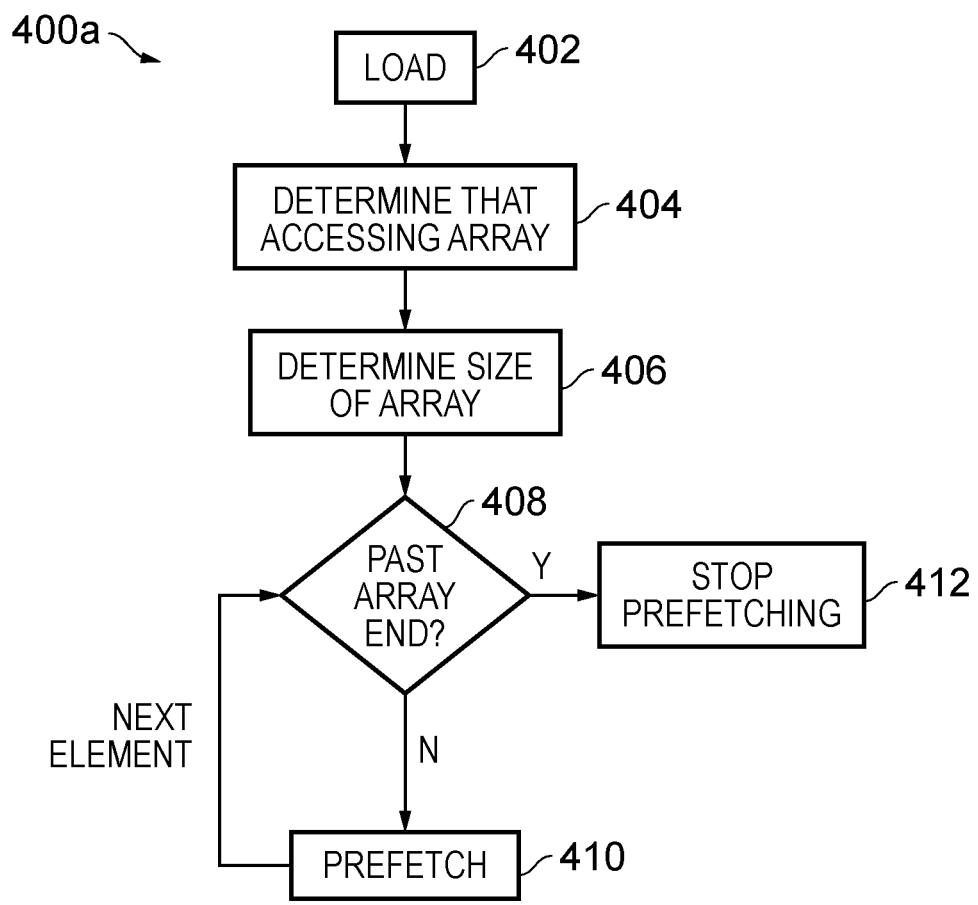
Figure 4B:
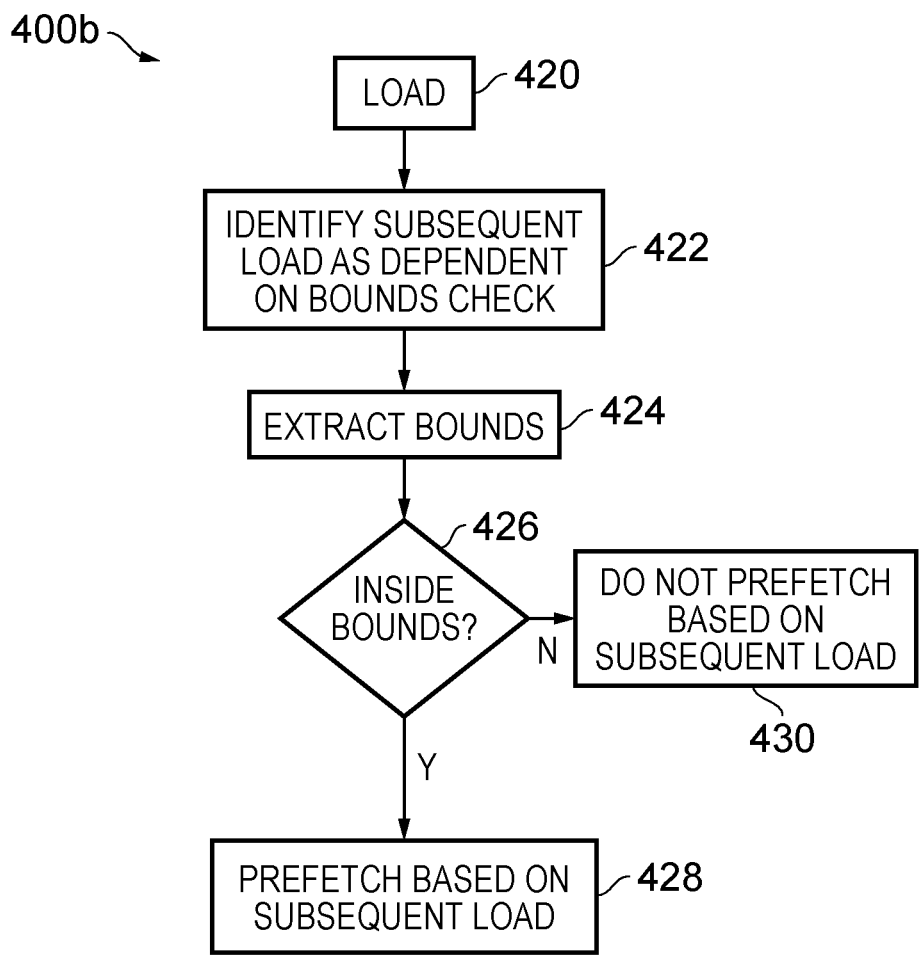
Figure 4C:
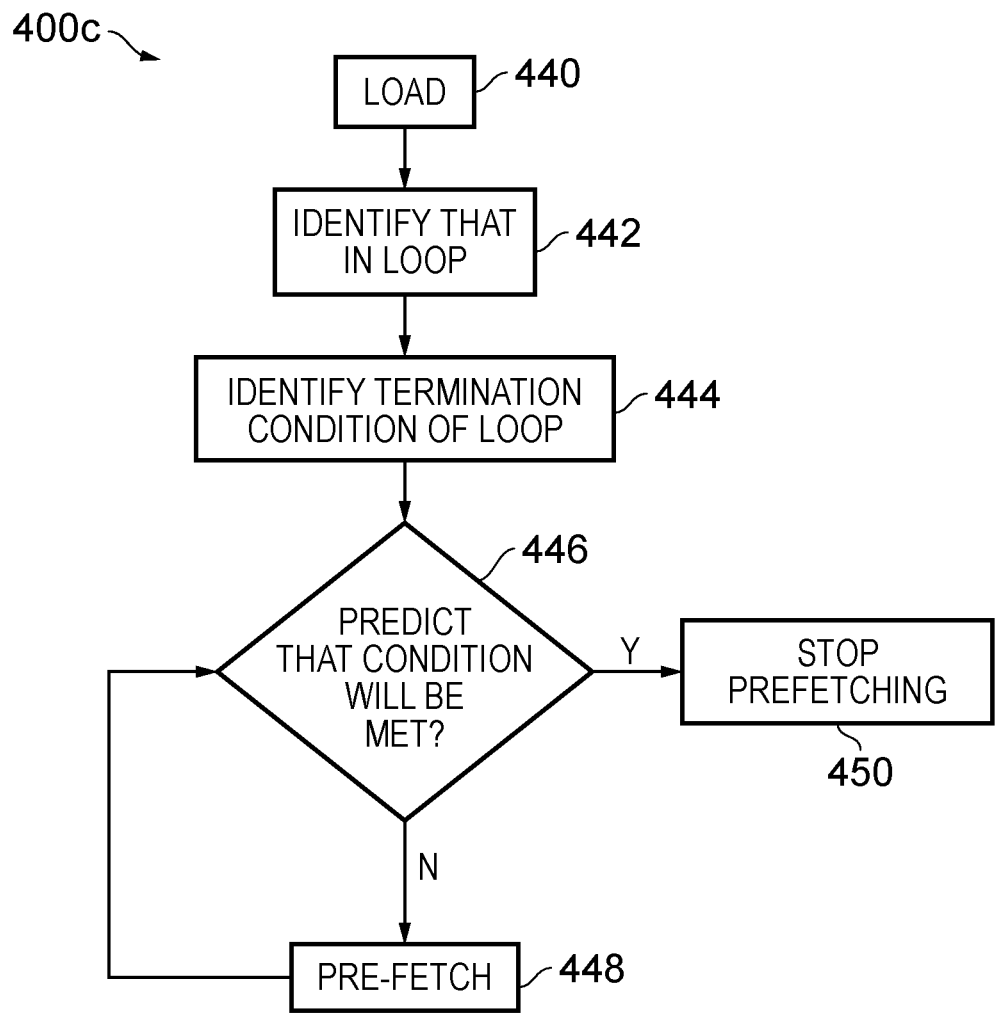

The present technique will be described further, by way of illustration only, with reference to examples thereof as illustrated in the accompanying drawings, in which:
FIGS. 1A to 1C schematically depict processing apparatuses according to examples;
FIGS. 2A and 2B schematically illustrate processing apparatuses according to examples;

FIG. 3 is a flow diagram illustrating a method according to examples; and
FIGS. 4A to 4C are flow charts illustrating examples of prefetching.

As noted above, some data processing apparatuses execute instructions defining data processing operations. In such apparatuses the process of fetching data items into a cache, in order to have faster access to them when performing the data processing operations, can be relatively time-consuming. This can delay the performing of the data processing operations. To that end, some processing apparatuses perform prefetching of the data items into the cache. Such prefetching comprises predicting data items that will be subject to data processing operations. The prediction may be based on patterns of previous data item retrieval. In one case, if a number of data items are successively retrieved from regularly spaced memory addresses, such as every $8^{th}$ memory address, it may be predicted that this pattern will continue. For example, where the most recent data item retrievals have been from regularly spaced memory addresses x, x+8 and x+16, it may be predicted that the next retrieval would be from memory address x+24.

The predicted data items can then be fetched to the cache before they are required. Examples of the present disclosure aim to improve the accuracy of the predicting. This improves system performance by reducing the likelihood of erroneously prefetching data items that will not be subject to data processing and increasing the likelihood that the data item or items required for a given data processing operation will have been prefetched before that operation is performed.

As set out above, an example apparatus comprises execution circuitry to execute instructions defining data processing operations on data items, cache storage to store temporary copies of the data items, and prefetching circuitry. The prefetching circuitry is to predict that a data item will be subject to the data processing operations by the execution circuitry, by determining that the data item is consistent with an extrapolation of previous data item retrieval by the execution circuitry and identifying that at least one control flow element of the instructions indicates that the data item will be subject to the data processing operations by the execution circuitry. The prefetching circuitry is then to prefetch the data item into the cache storage.

Thus, the prediction process is informed not only by previous data item retrieval but also by information regarding the instructions, i.e. the at least one control flow element of the instructions. This improves the accuracy of the prediction relative to comparative systems in which the prediction is based only on previous data item retrieval and not on information regarding the instructions.

Furthermore, by reducing or eliminating the prefetching of data items corresponding to control flow branches that will not be executed, examples of the present disclosure improve security by reducing the susceptibility of the processing apparatus to vulnerabilities that rely on speculative execution of such control flow branches.

In some examples, the aforementioned determining comprises identifying that a further data item is used as a pointer to a memory location storing the data item, and the prefetching comprises prefetching the further data item into the cache storage. In this manner, the accuracy of the prediction process can be improved by identifying that particular data items are used as pointers and then, based on this, prefetching the data items to which such pointers point. This may be termed "pointer prefetching".

In some examples, the instructions may define a bounds check to be performed on a pointer before the data item to which that pointer points is loaded. Where pointer prefetching is implemented, the aforementioned at least one control flow element of the instructions may thus comprise a pointer value bounds check on the further data item. Thus, before prefetching a data item to which a pointer points, it can be determined whether the pointer would satisfy the bounds check and thus whether the data item would be required. The data item is then prefetched only if the pointer would satisfy the bounds check.

In examples, the apparatus comprises a sequence of pipelined stages including the execution circuitry. The prefetching circuitry is arranged to receive an indication of the control flow element of the instructions from a pre-execution circuitry stage of the sequence of pipelined stages. The indication of the control flow element can thereby be provided to the prefetching circuitry in advance of execution of the corresponding instructions, facilitating the process of predicting the data items that will be required during execution of those instructions.

In some such examples, the particular pre-execution circuitry stage of the sequence of pipelined stages is a decode stage of the sequence of pipelined stages. For example, the decode stage may comprise a micro-op cache to store at least partially decoded instructions. Such a decode stage may be arranged to determine the indication of the control flow element in dependence on contents of the micro-op cache. In some systems, micro-ops are held in such a cache for a period of time: determination of the indication of the control flow element can be performed during this period of time, which can reduce or eliminate the need for extra time to perform the determination, thereby improving system performance. Moreover, the path by which micro-ops are stored in the micro-op cache is not on the critical path of the pipeline, so this does not degrade pipeline throughput.

In other examples, the particular pre-execution circuitry stage of the sequence of pipelined stages is an issue stage of the sequence of stages. The indication of the control flow element may then comprise a data hazard identification made at the issue stage. One aspect of data hazard determination may be a determination that a later operation depends on an earlier operation in a manner that suggests that a data item corresponding to the earlier operation is used as a pointer to a data item corresponding to the later operation. The outcome of this determination can thus be provided to the prefetch circuitry, which can use the information to prefetch the data item corresponding to the later operation.

In examples, the instructions define an instruction loop, and the at least one control flow element comprises at least one property of the loop indicating whether the data item will be subject to the data processing operations. For example, the at least one property may comprise a number of iterations of the loop to be executed. The prefetching circuitry can thus prefetch data items that are to be retrieved during a loop of the instructions, for example by determining that data items are being retrieved from regularly-spaced memory addresses and predicting that this will continue. The prefetching circuitry can then stop prefetching the regularly-spaced data items once the item corresponding to the final loop iteration has been prefetched. The accuracy of the prefetching is thus improved relative to systems in which the number of iterations of the loop is not taken into account in the prefetching, and consequently the prefetching circuitry continues to prefetch data items from regularly-spaced memory addresses following the data item corresponding to the final loop iteration. Indeed it is recognised here that prefetching beyond the end of a loop could be a vulnerability, if the further memory locations are subject to protection and should not be accessed by unauthorised software. Terminating the prefetching coincident with the end of the loop thus closes the possible vulnerability.

Alternatively or additionally, the at least one property may comprise a termination condition of the loop. The prefetching can thus depend on whether the termination condition will be met, thereby improving the accuracy of the prefetching: if the termination condition will not be met, the prefetching circuitry can prefetch data items that will be retrieved during execution of the loop. Conversely, if the termination condition will be met, the prefetching circuitry can avoid prefetching data items that would otherwise have been retrieved during execution of the loop, had the termination condition not been met. The termination condition may be a data value dependent termination condition, for example which would cause execution of the loop to stop when a particular memory address is accessed.

Examples of the present disclosure will now be described with reference to the Figures.

FIGS. 1A to 1C schematically illustrate examples of a data processing apparatuses 100a, 100b, 100c.

With reference to FIG. 1A, the apparatus 100a has a processing pipeline comprising a number of pipeline stages. The pipeline includes a branch predictor 105 for predicting outcomes of branch instructions and generating a series of fetch addresses of instructions to be fetched. A fetch stage 110 fetches the instructions identified by the fetch addresses from an instruction cache 115. A decode stage 120 decodes the fetched instructions to generate control information for controlling the subsequent stages of the pipeline. A rename stage 125 performs register renaming to map architectural register specifiers identified by the instructions to physical register specifiers identifying registers 130 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 115, which can improve performance by allowing a later instruction to execute while an earlier instruction is waiting for an operand to become available. The ability to map architectural registers to different physical registers can also facilitate the rolling back of architectural state in the event of a branch misprediction. An issue stage 135 queues instructions awaiting execution until the required operands for processing those instructions are available in the registers 130. An execute stage 140 executes the instructions to carry out corresponding processing operations. A writeback stage 145 writes results of the executed instructions back to the registers 130.

The execute stage 140 may include a number of execution units such as a branch unit 150 for evaluating whether branch instructions have been correctly predicted, an ALU (arithmetic logic unit) 155 for performing arithmetic or logical operations, a floating-point unit 160 for performing operations using floating-point operands and a load/store unit 165 for performing load operations to load data from a memory system to the registers 130 or store operations to store data from the registers 130 to the memory system. In this example the memory system includes a level one instruction cache 115, a level one data cache 170, a level two cache 175 which is shared between data and instructions, and main memory 180, but it will be appreciated that this is just one example of a possible memory hierarchy and other implementations can have further levels of cache or a different arrangement. The load/store unit 165 may use a translation lookaside buffer 185 and the fetch unit 110 may use a translation lookaside buffer 190 to map virtual addresses generated by the pipeline to physical addresses identifying locations within the memory system. It will be appreciated that the pipeline shown in FIG. 1A is just one example and other examples may have different sets of pipeline stages or execution units. For example, an in-order processor may not have a rename stage.

A prefetcher 195 is configured to receive memory addresses that are the subject of load or store operations from the load/store unit 165 to the level one data cache 170. The prefetcher 195 extrapolates from the memory addresses of these previous operations to determine data items that are consistent with patterns of data item retrieval. For example, if load operations are performed for a number of regularly-spaced memory addresses, the prefetcher 195 may determine that further memory addresses with the same regular spacing are likely to be the subject of future load operations.

The prefetcher 195 also receives an indication of at least one control flow element of the instructions. This indication is received from earlier in the pipeline than the execute stage 140, for example from the decode stage 120 or issue stage 135 (shown as options with dotted lines in FIG. 1A). Based on this indication, the prefetcher 195 identifies whether the control flow element indicates that the aforementioned extrapolated data items will be subject to data processing by the execute stage 140. For example, the extrapolation of memory addresses might suggest that a particular data item would be loaded, whilst the control flow element indicates that that data item would not in fact be loaded. In such a case, the prefetcher 195 would not prefetch that data item. Conversely, if the control flow element indicates that that data item would be loaded, the prefetcher 195 would prefetch that data item. Particular examples of such control flow elements are described elsewhere in the present disclosure.

FIG. 1B shows a processing apparatus 100b comprising elements corresponding to those of apparatus 100a. Corresponding elements are shown with the same reference numerals.

The prefetcher 195 of apparatus 100b is configured to receive the indication of the control flow element from a micro-op cache 122, otherwise termed a u-op cache, of the decode stage 120. In this example, the decode stage 120 decodes received instructions into low-level commands to be executed by the execute stage 140. The low-level commands, termed micro-ops, are buffered in the micro-op cache 122 for delivering to the next stage in the pipeline. While the micro-ops are stored in the cache 122, they are analysed to identify instances in which load operations depend on prior load operations in such a manner as to suggest that the data item loaded in the prior load is used as a pointer to the data item loaded in the subsequent load. Information describing such dependencies is stored in a part 123 of the micro-op cache 122. This information indicates a control flow element of the instructions and is provided to the prefetcher 195 for use in predicting data items that are to be loaded.

FIG. 1C shows a processing apparatus 100c comprising elements corresponding to those of apparatus 100a. Corresponding elements are shown with the same reference numerals.

The prefetcher 195 of apparatus 100c is configured to receive the indication of the control flow element from a data hazard identification unit 137 of the issue stage 135. The issue stage 135 is configured to store micro-ops received from the previous stage of the pipeline and issue them to the execute stage 140. The order of issuing the micro-ops can be modified, for example to optimise the resources of the execute stage 140. The data hazard identification unit 137 identifies data hazards, wherein particular micro-ops depend on earlier micro-ops, in order to ensure that a given micro-op is not issued before any other micro-ops on which it depends. By identifying such dependencies, the data hazard identification unit 137 can also identify pointer-like behaviour, wherein a given data item is loaded from a memory address that was stored in a previously-loaded data item. Information describing this pointer-like behaviour indicates a control flow element of the instructions and is provided to the prefetcher 195 for use in predicting data items that are to be loaded.

FIG. 2A shows a schematic representation of a processing apparatus 200 according to an example. The apparatus 200 comprises execution circuitry 205 to execute instructions defining data processing operations on data items. The execution circuitry may for example be an execute block of a processing pipeline such as that described above with reference to FIGS. 1A, 1B and 1C.

The apparatus 200 comprises a cache storage 210 to store temporary copies of the data items.

The apparatus 200 comprises execution prediction circuitry 215 to predict that a data item will be subject to the data processing operations by the execution circuitry. The execution prediction circuitry comprises a consistency determination block 220 to determine that the data item is consistent with an extrapolation of previous data item retrieval by the execution circuitry, and an execution identification block 225 to identify that at least one control flow element of the instructions indicates that the data item will be subject to the data processing operations by the execution circuitry.

The apparatus 200 comprises prefetching circuitry 230 to prefetch the aforementioned data item into the cache storage 210. The execution prediction circuitry 215 and the prefetching circuitry 230 may be considered together as a combined prefetching unit 235.

FIG. 2B shows schematically an example configuration of the execution prediction circuitry 215. The execution prediction circuitry 215 comprises a consistency determination block 220 and an execution identification block 225 as described in relation to FIG. 2A. The consistency determination block 220 comprises a pointer identification sub-block 240. The pointer identification sub-block 240 is to identify that a given first data item is used as a pointer to a memory location storing a second data item. For example, this may be determined based on an indication, provided from a decode stage to the prefetching unit 235, that the first data item is used as a pointer. The execution prediction circuitry 215 may then, based on the pointer identification, predict that the second data item will be the subject of data processing operations by the execution circuitry 205 and prefetch the second data item to the cache storage 210.

FIG. 3 is a flow diagram illustrating a method 300 according to examples of the present disclosure.

The method 300 comprises a step 305 of predicting that a data item will be subject to a data processing operation. This compresses a first sub-step 310 of determining that the data item is consistent with an extrapolation of previous data item retrieval, and a second sub-step 315 of identifying that at least one control flow element of the instructions indicates that the data item will be subject to the data processing.

Although FIG. 3 shows the sub-steps 310 and 315 as being consecutive, in other examples the sub-steps are performed simultaneously. In other examples, the sub-step 315 is performed before the sub-step 310.

The method 300 then comprises a step 320 of prefetching the predicted data item into cache storage.

The method 300 then comprises a step 325 of executing the data processing operation on the data item.

Various examples of prefetching will now be described with reference to FIGS. 4A, 4B and 4C.

FIG. 4A is a flow chart 400a illustrating prefetching according to an example.

At block 402, a data item is loaded, for example from a memory into a register as described above in relation to FIG. 1A.

At block 404, it is determined that the loaded data item is an element of an array. In some cases, it is likely that the remaining array elements would subsequently be loaded.

At block 406, the size of the array is determined.

At block 408, it is determined whether the end of the array has been passed. If the end has not been reached, a further array entry is prefetched at block 410 and the flow proceeds back to block 408 for the next array element. In this manner, each array element is prefetched in turn.

If, at block 408, it is determined that the end of the array has been passed, the flow proceeds to block 412 where prefetching is stopped. The erroneous prefetching of data items at memory addresses after the end of the array is thus averted.

FIG. 4B is a flow chart 400b illustrating prefetching according to a further example.

At block 420, a data item is loaded, for example from a memory into a register as described above in relation to FIG. 1A.

At block 422, a subsequent load operation is identified as dependent on a bounds check. For example, the data item loaded at block 420 may be a pointer to the subsequent data item, and the bounds check may be a check that the memory address of the subsequent data item is within a range of memory addresses to which the pointer is allowed to point.

At block 424, the bounds of the bounds check are extracted. The extraction may for example be performed at a decode stage of a processing pipeline, as described in more detail above.

At block 426, it is determined whether the memory address of the subsequent data item lies within the extracted bounds. If the determination is positive, at block 428 the subsequent data item is prefetched. If the determination is negative, at block 430 the subsequent data item is not prefetched. The data item is thus only prefetched if the pointer bounds would be satisfied such that the subsequent load will occur.

FIG. 4C is a flow chart 400c illustrating prefetching according to a further example.

At block 440, a data item is loaded, for example from a memory into a register as described above in relation to FIG. 1A.

At block 442, it is identified that the loading of the data item forms part of an instruction loop. For example, a prefetcher may identify that the load was preceded by a number of other loads of data items with regularly-spaced memory addresses. In other examples the identification is performed by a decode stage of a processing pipeline, based on instructions to be executed.

At block 444, a termination condition of the loop is identified. For example, the aforementioned decode stage may determine that the loop is to iterate over incrementing memory addresses until a particular address is reached, following which the loop is to terminate.

At block 446, it is predicted whether the termination condition will be met when the instructions corresponding to the next iteration of the loop are executed. If the condition will not be met, at block 448 the data item corresponding to the next loop iteration is prefetched. The flow then proceeds back to block 446 for the next loop iteration. If the condition will be met, at block 450 the prefetching is stopped. In this manner a prefetcher can prefetch data items that will be loaded when subsequent iterations of the loop are executed, but not prefetch subsequent data items that would not be loaded as a consequence of the termination of the loop.

Through use of the above described techniques, it will be appreciated that the accuracy of prefetching can be improved, such that the prefetching of data items that will not be subject to data processing is reduced or eliminated.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   execution circuitry to execute instructions defining data processing operations on data items;
   cache storage to store temporary copies of the data items; and
   prefetching circuitry to:
   a) predict that a data item will be subject to the data processing operations by the execution circuitry by:
      determining that the data item is consistent with an extrapolation of previous data item retrieval by the execution circuitry; and
      identifying that at least one control flow element of the instructions indicates that the data item will be subject to the data processing operations by the execution circuitry, and
   b) prefetch the data item into the cache storage;
   wherein the determining comprises identifying that a further data item is used as a pointer to a memory location storing the data item;
   the prefetching further comprises prefetching the further data item into the cache storage;
   the at least one control flow element of the instructions comprises a pointer value bounds check on the further data item to check whether a memory address of the data item is within a range of memory addresses to which the pointer is allowed to point.

2. An apparatus according to claim 1, wherein:
   the apparatus comprises a sequence of pipelined stages including the execution circuitry;
   the prefetching circuitry is arranged to receive an indication of the control flow element of the instructions from a pre-execution circuitry stage of the sequence of pipelined stages.

3. An apparatus according to claim 2, wherein the pre-execution circuitry stage of the sequence of pipelined stages is a decode stage of the sequence of pipelined stages.

4. An apparatus according to claim 3, wherein:
the decode stage comprises a micro-op cache to store at least partially decoded instructions; and
the decode stage is arranged to determine the indication of the control flow element in dependence on contents of the micro-op cache.

5. An apparatus according to claim 2, wherein the pre-execution circuitry stage of the sequence of pipelined stages is an issue stage of the sequence of stages.

6. An apparatus according to claim 5, wherein the indication of the control flow element comprises a data hazard identification made at the issue stage.

7. An apparatus according to claim 1, wherein:
the instructions define an instruction loop; and
the at least one control flow element comprises at least one property of the loop indicating whether the data item will be subject to the data processing operations.

8. An apparatus according to claim 7, wherein:
the at least one property comprises a number of iterations of the loop to be executed.

9. An apparatus according to claim 7, wherein:
the at least one property comprises a termination condition of the loop.

10. An apparatus according to claim 9, wherein:
determining that the at least one control flow element of the instructions indicates that the data item will be subject to the data processing operations comprises determining whether the termination condition will be met.

11. An apparatus according to claim 9, wherein the termination condition is a data value dependent termination condition.

12. A method comprising:
predicting that a data item will be subject to a data processing operation by:
determining that the data item is consistent with an extrapolation of previous data item retrieval; and
identifying that at least one control flow element of the instructions indicates that the data item will be subject to the data processing,
prefetching the data item into cache storage; and
executing the data processing operation on the data item;
wherein the determining comprises identifying that a further data item is used as a pointer to a memory location storing the data item;
the prefetching further comprises prefetching the further data item into the cache storage;
the at least one control flow element of the instructions comprises a pointer value bounds check on the further data item to check whether a memory address of the data item is within a range of memory addresses to which the pointer is allowed to point.

13. The apparatus according to claim 1, wherein the prefetch circuitry is configured to determine whether to prefetch the data item based on whether the memory address of the data item is within the range of memory addresses to which the pointer is allowed to point.

* * * * *